(12) United States Patent
Flucker et al.

(10) Patent No.: US 8,087,870 B2
(45) Date of Patent: Jan. 3, 2012

(54) CONTROLLING OPERATION OF A COMPRESSOR TO AVOID SURGE

(75) Inventors: Steven S. Flucker, Clevedon (GB); Stephen W. Moore, Bristol (GB); Jonathon M. Moore, Bristol (GB); Caroline L. Turner, Le Luc (FR)

(73) Assignee: Rolls-Royce PLC, London (GB)

( * ) Notice: Subject to any disclaimer, the term of this patent is extended or adjusted under 35 U.S.C. 154(b) by 994 days.

(21) Appl. No.: 12/071,030

(22) Filed: Feb. 14, 2008

(65) Prior Publication Data

US 2008/0264067 A1    Oct. 30, 2008

(30) Foreign Application Priority Data

Apr. 26, 2007  (GB) .................................. 0708063.3

(51) Int. Cl.
*F04D 27/02*    (2006.01)
(52) U.S. Cl. .......................................................... 415/1
(58) Field of Classification Search ................ 415/1, 15, 415/17, 26, 51, 118; 416/35, 36, 61; 60/793, 60/786
See application file for complete search history.

(56) References Cited

U.S. PATENT DOCUMENTS

| | | | |
|---|---|---|---|
| 3,797,233 A * | 3/1974 | Webb et al. ..................... | 60/791 |
| 3,932,058 A | 1/1976 | Harner et al. | |
| 4,936,740 A | 6/1990 | Blotenberg | |
| 7,094,019 B1 | 8/2006 | Shapiro | |

FOREIGN PATENT DOCUMENTS

| | | |
|---|---|---|
| EP | 1 256 726 A1 | 11/2002 |
| JP | A-2005-146927 | 6/2005 |
| WO | WO 2006/017365 A2 | 2/2006 |

OTHER PUBLICATIONS

Warnock J.D., "Typical Compressor Control Configurations", Advances in Instrumentation, Instrument Society of America, Research Triangle Park, US, vol. 31, No. 1, Oct. 11, 1976, pp. 587(1)-587(15), XP002030689.
German Search Report dated Jun. 6, 2008 in Application No. GB0802220.4.
European Search Report dated Apr. 18, 2008 in Application No. EP 08 03 3511.

* cited by examiner

*Primary Examiner* — Edward Look
*Assistant Examiner* — Narcrisha Norman
(74) *Attorney, Agent, or Firm* — Oliff & Berridge, PLC

(57) ABSTRACT

A compressor or fan is controlled to avoid stall, surge or flutter. The control system includes a look-up table from which is retrieved a margin-adjusted limiting value of a control parameter of the compressor, using inputs representing inlet guide vane angle (IGV), non-dimensional speed of the compressor ($N/R\sqrt{T}$), vehicle Mach number (Mn) and inlet geometry (IG). A variable stall, surge or flutter safety margin about a nominal limiting value of a control parameter is pre-established to reflect threats to the working, stall, flutter and surge lines, for example as a result of measurement inaccuracies, and from this the margin-adjusted limiting value is derived. An actual value of the control parameter is determined in real time, and the actual value is compared with the margin-adjusted limiting value. An output signal indicating stall, surge or flutter risk is generated if the actual value falls within the stall, surge or flutter safety margin.

22 Claims, 5 Drawing Sheets

CONTROLLING OPERATION OF A COMPRESSOR TO AVOID SURGE

BACKGROUND

This invention relates to a method of controlling the operation of a fan or compressor to avoid surge and/or stall and/or flutter, and is particularly, although not exclusively, concerned with fans or compressors for aircraft use. Such fans or compressors are typically driven by a turbine stage of a gas turbine engine by means of a driveshaft.

For convenience, the expression "compressor" is used in this specification to embrace fans, which discharge gas (usually air) directly into the surroundings to provide a propulsive force, or discharged into a pipe/duct so as to be pumped along the pipe/duct, and compressors which compress a working fluid (again, usually air) which is subsequently mixed with fuel and ignited either to provide a propulsive jet flow or to drive a turbine, or a combination of the two.

In steady state operation, a compressor operates on a working line, determined by the effective exit area of the compressor, in a stable manner. However, under some operating conditions, particularly when the compressor is operating at high speed and supporting a high pressure ratio, the compressor operation may be such that at some operating points the working line can approach a stability line. If the compressor operates beyond the stability line, stall or surge may occur, which result from the breakdown of the air flow through the compressor. Surge can have a major effect on compressor output, leading to a loss of thrust, and possibly damage to the compressor itself or other parts of the engine from which it is driven. Another influence on compressor stability is known as flutter, which is a self-excited oscillation that occurs in compressor aerofoils. This can result in fatigue damage and/or failure of the aerofoils. A flutter stability line can be defined in a similar way to that for surge/stall.

It is consequently important to monitor the operating point of the compressor and to control its operation to avoid surge or other detrimental instabilities. U.S. Pat. No. 7,094,019 discloses one such monitoring method, in which the current pressure ratio across the compressor is compared with the compressor's pressure ratio at surge limit conditions. A predetermined safety margin is established, expressed as a percentage of the total span of the compressor's pressure ratio.

It is known for such safety margins to be defined by identifying marginal "pinch points" in the operational range of the compressor and to build in threats at these pinch points and then to prove empirically that, on a statistical basis, the likelihood of all of the threats arising at the same time at a pinch point is vanishingly small, so that the safety margin is adequate and the compressor is safe from surge and other related instabilities. By "pinch points" is meant regions of the stability line which approach the working line of the compressor more closely that other regions.

Where intakes to the compressor have little or no variable geometry, the working line of the compressor is established by fixing the geometric nozzle area so that it is sufficiently far from the stability line to prevent surge at the most demanding operational condition.

However, some engines or propulsive fans have multiple variable geometries. For example, the compressor may have variable inlet guide vanes that can vary independently of fan speed, a variable nozzle area, variable nozzle geometry (and hence discharge coefficient). Adjustment of any of these features will vary the working line of the compressor. Additionally, inlet flow distortion can be a severe threat to surge margin, the effect of such distortion varying with flight condition for some intake configurations.

If a fixed safety margin is established to accommodate all of these threats under different flight conditions, the result is a working line which is so far from the stability line as to be impractical. Thus, although a fixed safety margin can be established which results in a nozzle area that prevents surge at the worst condition, the safety margin will prohibit the compressor from producing sufficient thrust, or operating at maximum efficiency, at other flight conditions.

SUMMARY

According to the present invention, there is provided a method of controlling the operation of a compressor to avoid stall, surge or flutter, the compressor having an inlet provided with inlet guide vanes, the method including predetermining: a nominal limiting value of a control parameter of the compressor; a variable stall, surge or flutter safety margin as a function of inlet guide vane angle (IGV), non-dimensional speed of the compressor ($N/R\sqrt{T}$), vehicle Mach number (Mn) and inlet geometry (IG); and a margin-adjusted limiting value of the control parameter of the compressor as a function of the nominal limiting value and variable stall, surge or flutter safety margin. The method further includes, during operation of the compressor: continuously retrieving the margin-adjusted limiting value of the control parameter of the compressor as a function of inlet guide vane angle (IGV), non-dimensional speed of the compressor ($N/R\sqrt{T}$), vehicle Mach number (Mn) and inlet geometry (IG); determining in real time an actual value of the control parameter; comparing the actual value with the margin-adjusted limiting value; and providing an output signal indicating stall, surge or flutter risk if the actual value falls within the stall, surge or flutter safety margin.

By employing a method in accordance with the present invention, and selecting an appropriate control parameter, it is possible to improve the operating flexibility of the compressor, so that the operating range of the compressor is maximised, allowing it to achieve the best range of thrust and efficiency.

Prior to operation a stall and/or surge and/or flutter stability safety margin is established (from testing, analysis or modelling) about a nominal stability limit of the nominal limiting value of the control parameter and hence a margin-adjusted limiting value is derived, which is loaded into the compressor control system. This safety margin is variable dependant on the size of the threats relevant to each particular operating point.

This signal indicating stall, surge or flutter can act as a limit on the control system to avoid operating beyond the margin-adjusted limiting value of the control parameter and/or attenuate the control system rates of change as it approaches the margin adjusted limiting value of the control parameter, and for the control system to return the fan or compressor to a safe operating point if the limit has been exceeded.

Preferably the output signal is input to control means to modify the condition of the compressor to adjust the actual value of the control parameter to fall outside the stall, surge or flutter safety margin.

Preferably the output signal is input to control means to modify or stabilise the condition of the compressor such that the actual value of the control parameter is outside the stall, surge or flutter safety margin.

Preferably the output signal is input to control means to reduce the rate of change of the compressor condition as the actual value of the control parameter approaches the stall, surge or flutter safety margin.

The margin-adjusted limiting value of the control parameter is preferably stored in a look-up table having inputs for IGV, N/R√T, Mn and IG, where Mn is the air speed of the vehicle which incorporates the compressor. The limiting values of the control parameter may be determined by modelling threats near stall and/or surge and/or flutter conditions, and by compressor stall, surge or flutter testing. Uncertainties related to the limiting and actual values of the selected control parameter or that influence the limiting value (for example pressures, vane angle actuation, speeds, etc) of the control parameter are quantified on the basis of measurement and actuation tolerances, and combined using established statistical techniques such as Monte Carlo or root sum squared for a sample of operating points to provide a threat value. The threat values at different operating points are then correlated against an appropriate parameter, such as corrected mass flow, to generate a curve fitting a general equation for the threat at all operating points. Other threats to the stall, surge or flutter line or working line are then reviewed for relevance in terms of the control method (ie the selected parameter) being used. The various threats to the safety margin created by these uncertainties (and other uncertainties on the inputs of the look-up table) are combined, for example in the performance computer model, to form a stack up using established statistical techniques. The statistically likely overall threat is then used to derive the margin-adjusted limiting value of the control parameter, at which, effectively, there is zero stall, surge or flutter margin for various operating parameter combinations. The limiting value data generated from this exercise is compiled into the look-up tables which are incorporated into the engine control system. That is to say, margin-adjusted limiting values of the control parameter are "pre-stored" in the control system prior to use, and during operation of the control system are retrieved, or determined, as a function of inlet guide vane angle (IGV), non-dimensional speed of the compressor (N/R√T), vehicle Mach number (Mn) and inlet geometry (IG).

DETAILED DESCRIPTION OF THE EMBODIMENTS

For a better understanding of the present invention, and to show more clearly how it may be carried into effect, reference will now be made, by way of example, to the following Examples, in conjunction with the accompanying drawings, which include graphs illustrating operating characteristics of compressors or fans in terms of different operating parameters.

Operation of the compressor or fan to avoid stall, surge or flutter may be controlled on the basis of different parameters, as follows:

EXAMPLE 1

Effective Nozzle Area

For this method, a limit is imposed on effective exit nozzle area (AE) to prevent fan instability. Real-time effective exit nozzle area ($AE_{act}$) cannot be measured directly, so it is derived using the geometry of the nozzle. For example $AE_{act}$ is derived as a function of the geometric area (AG) of the nozzle and other factors that alter effective exit nozzle area, such as vane geometry (ANGVG) and measured nozzle pressure ratio (NPR). AG and ANGVG may be determined directly by sensing of the nozzle actuator positions or other geometric characteristics of the nozzle, or from control signals or other data which determine such positions or characteristics. NPR is measured directly using total pressure probes at compressor or fan exit ($P_{T3}$) and measured values of ambient pressure ($P_{amb}$).

The limiting minimum value of effective exit nozzle area ($AE_{lim}$) is a function of four parameters (inlet guide vane angle (IGV), corrected speed (N/R√T), vehicle Mach number (Mn) and intake geometry (IG)). The values for ($AE_{lim}$) are retrieved for each operating condition from a look-up table receiving inputs of the four parameters referred to above. The values for actual effective exit nozzle area ($AE_{act}$) are determined as a function of AG, NPR and ANGVG established from rig testing.

Figure 1:
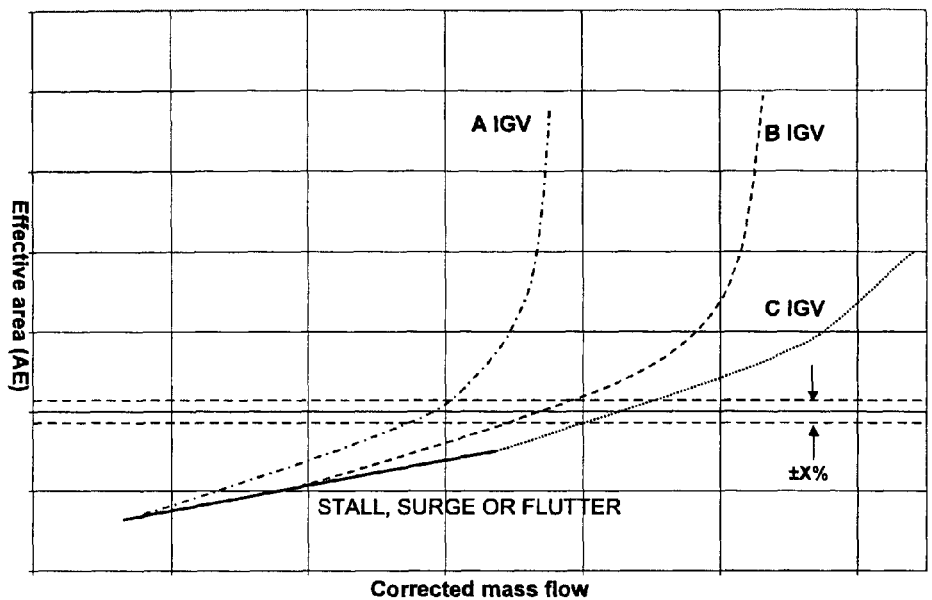
FIG. 1 presents variation of Effective Nozzle Area with corrected mass flow as a stability line is approached.

FIG. 1 shows how AE varies with corrected mass flow as the stall, surge or flutter (or stability) line is approached. IGV lines for A, B and C relate to different inlet guide vane angle, relative to the direction of inlet gas flow where A>B>C. When the value of AE for a given IGV angle meets the stability line then the compressor is at risk of stall, surge or flutter. Measurement uncertainty for effective exit nozzle area can be calculated as ±x % for a critical engine condition, and is shown in FIG. 1 as dotted lines on opposite sides of a selected value for $AE_{act}$. Since only a short length of the characteristic line for each IGV value shown is covered by the uncertainty range for the compressor represented in FIG. 1, the effective nozzle area can be regarded as a useful control parameter for the engine. Also, NPR is the only aerodynamic measurement needed to establish AE, and NPR has been shown not to be sensitive to intake conditions. Consequently, the risk of inaccuracy at different engine conditions is reduced.

EXAMPLE 2

Geometric Nozzle Area

The actual value of nozzle area ($AG_{act}$) can be determined in real-time in a similar manner to that of $AE_{act}$. However, the derivation of $AG_{act}$ does not require a measured nozzle pressure ratio (NPR) since NPR is inherent if the full set of fan variable geometry can be defined.

For this method, the look-up table in the control system for the compressor receives inputs relating to IGV, N/R√T, Mn, IG and any other factor that alters the geometric nozzle area, for example vane geometry. On the basis of these inputs, a limiting minimum value $AG_{lim}$ is retrieved for the particular operating point in question. Nozzle characteristics do not need to be read, as they can be inferred from control data used to size the nozzle and determine nozzle flow direction. As in the method of Example 1, measurement uncertainty is incorporated as a threat to modify the value of $AG_{lim}$.

Figure 2:
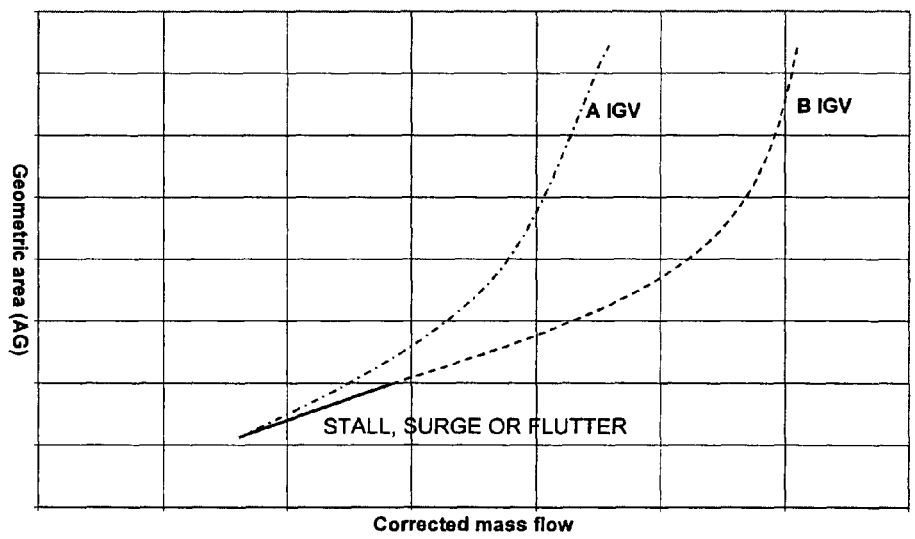
FIG. 2 shows geometric nozzle area characteristics for different values of IGV.

FIG. 2 represents geometric nozzle area characteristics for different values of IGV as derived from test data.

EXAMPLE 3

Fan Static Pressure Ratio

The inputs of IGV, N/R√T, Mn and IG can alternatively be applied to a look-up table to retrieve a limiting maximum value for fan static pressure ratio ($PR_{lim}$). This retrieved value of $PR_{lim}$ can be compared with a real-time value of the fan static pressure ratio ($PR_{act}$), obtained for direct measurement of the static pressures at the outlet and inlet of the fan, $P_{s3}$, $P_{s2}$.

Figure 3:
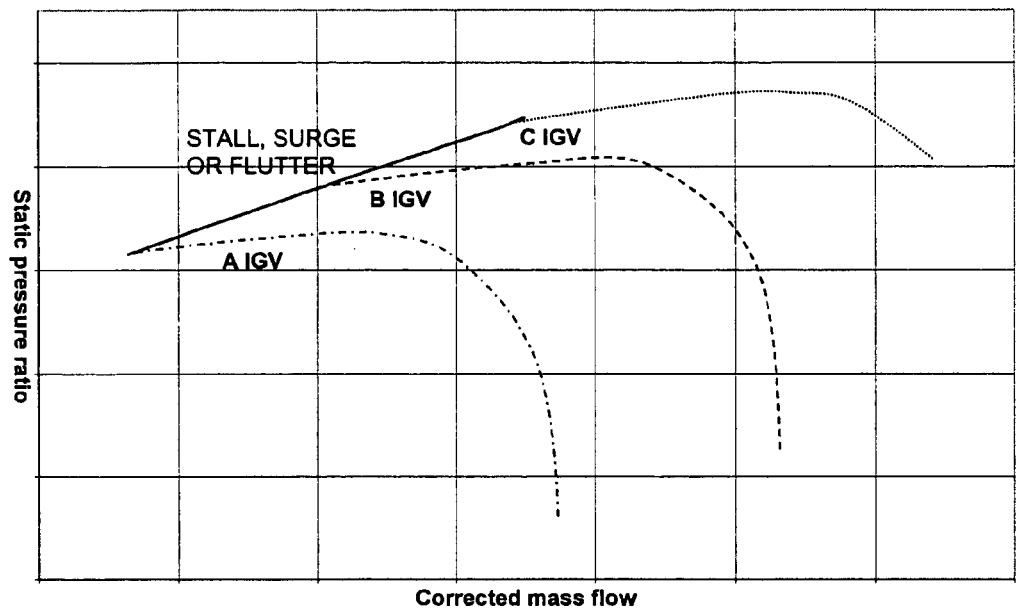
FIG. 3 presents fan static pressure ratio characteristics for different values of IGV.

FIG. 3 shows the shape of fan static pressure ratio characteristics for different values of IGV, as derived from test data.

It will be appreciated that, if a measurement error range as shown in FIG. 1 is superimposed on FIG. 3 at the regions of the characteristics approaching the stall, surge or flutter (or stability) line, a significant length of each characteristic will be embraced by the uncertainty range. This is because, as the characteristics approach the stability line, a small change in static pressure ratio results in a major change in corrected mass flow. Consequently, near the stability line, the value of pressure ration (PR) is very sensitive to measurement uncertainty. Consequently, for a fan or compressor having characteristics of the form shown in FIG. 3, use of fan static pressure ratio as the relevant parameter for controlling operation of the fan or compressor may not be appropriate.

Figure 4:
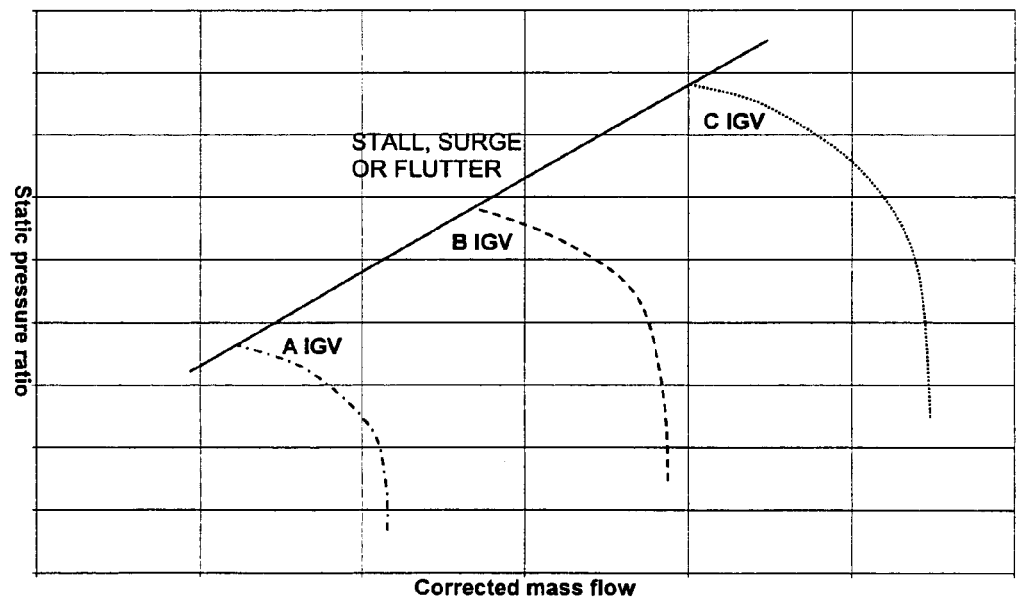
FIG. 4 presents alternative fan static pressure ratio characteristics for different values of IGV to that shown in FIG. 3.

However, other fans and compressors may have static pressure ratio characteristics similar to those shown in FIG. 4. It will be noted that the static pressure ratio continues to increase up to the stability line, so that measurement uncertainties have a smaller influence than with the fan or compressor represented in FIG. 3.

EXAMPLE 4

Corrected Torque

A further parameter that can be used to control fan or compressor operation is corrected torque (CT). In order to provide an actual value ($CT_{act}$) the driveshaft to the fan or compressor is fitted with a shaft torque meter, the output of which is input to the compressor control system. Alternatively the torque may be derived as a function of temperature, air flow rates and compressor rotational speed. The corrected torque is a function of the actual shaft torque and the inlet total pressure. Thus, in order to establish the value of $CT_{act}$, the inlet total pressure ($P_{1A}$) is measured. The limiting maximum value ($CT_{lim}$) is established from look-up tables on the basis of inputs representing IGV, N/R√T, Mn and IG.

Figure 5:
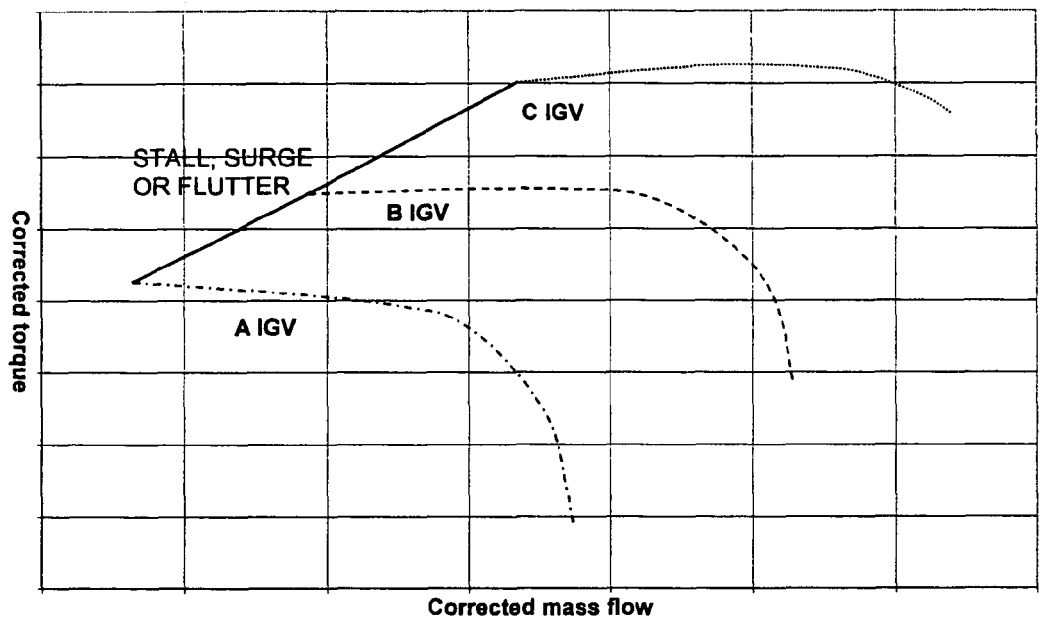
FIG. 5 shows variation of corrected torque for a fan or compressor at different values of IGV.
Figure 6:
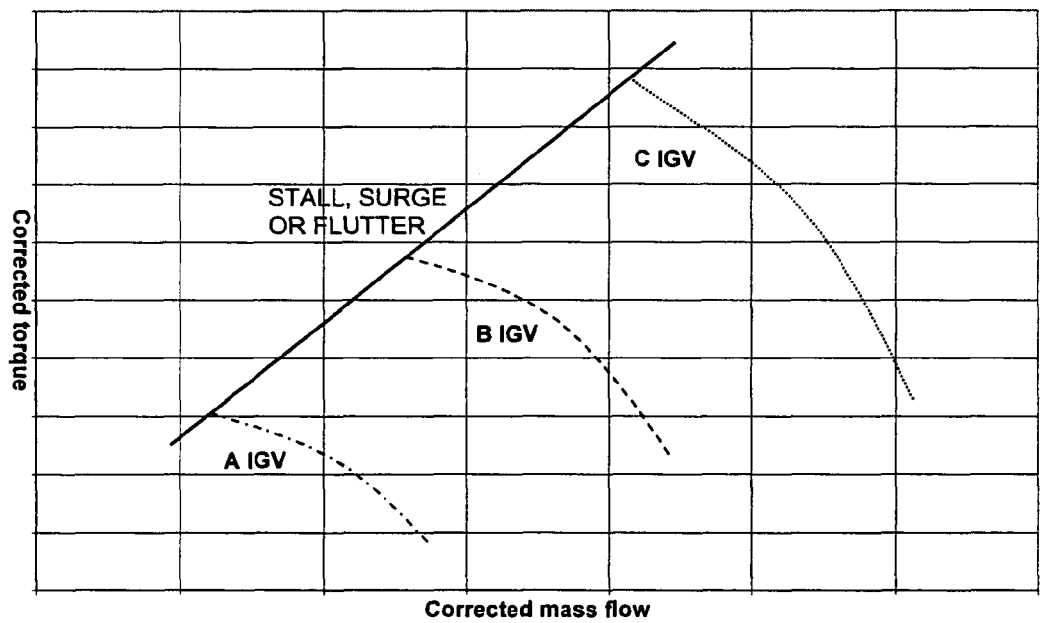
FIG. 6 shows alternative variations of corrected torque for a fan or compressor at different values of IGV to that shown in FIG. 5.

FIG. 5 shows characteristics based on corrected torque for a fan or compressor at different values of IGV. As with the static pressure ratio characteristics shown in FIG. 3, the characteristics of FIG. 5 become almost horizontal as the stability line is approached, and consequently this method of control may be unsuitable for such fans or compressors. However, it may be more appropriate for a fan or compressor having characteristics as shown in FIG. 6.

EXAMPLE 5

Exit Flow Function

Figure 7:
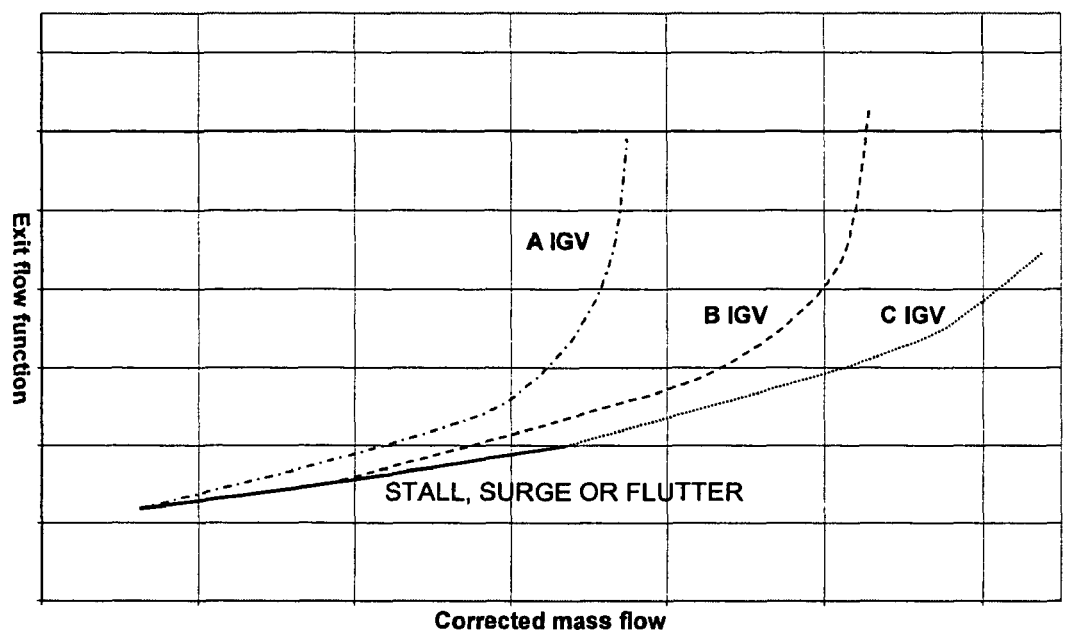
FIG. 7 shows variation exit flow function for a fan or compressor at different values of IGV.
Figure 8:
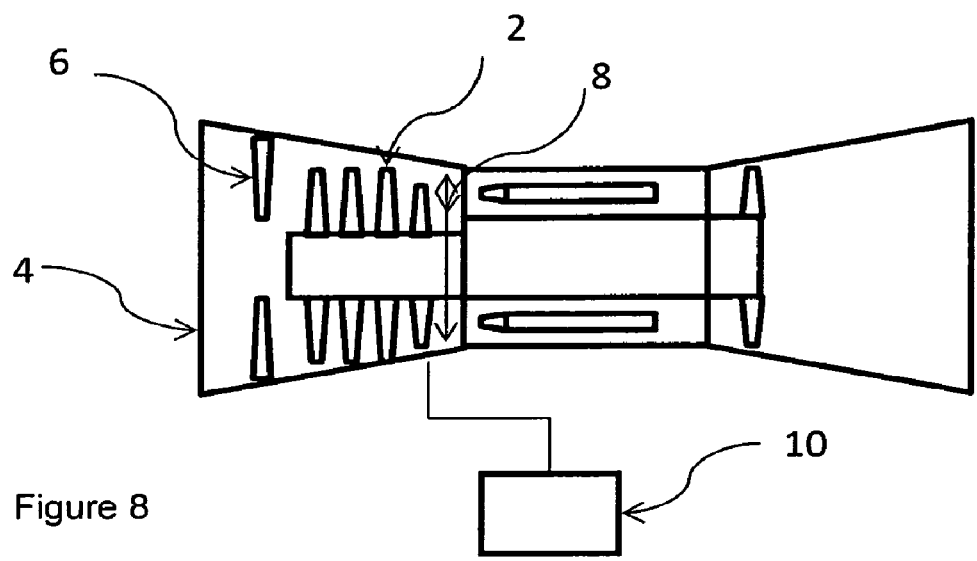
FIG. 8 shows a compressor 2 including an inlet 4, inlet guide vanes 6, a geometric area of the nozzle 8, and control system 10, in an exemplary embodiment.
Figure 9:
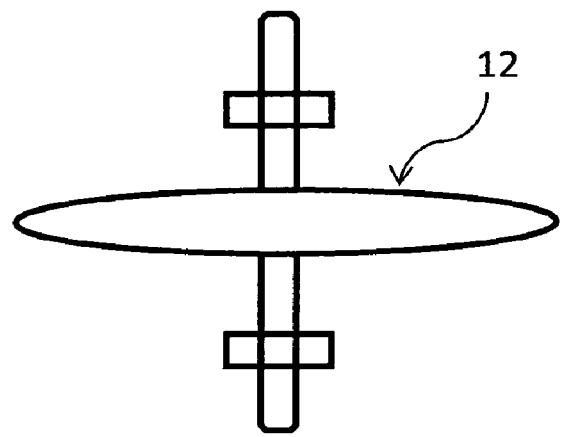
FIG. 9 shows an aircraft 12 including engines mounted on each wing, the engine including compressors having a control system in accordance with the exemplary embodiments described herein.

This method employs a limiting minimum value of exit flow function (Exit $FF_{lim}$) retrieved from a look-up table on the basis of inputs representing IGV, N/R√T, Mn and IG. Exit flow function (Exit FF) is a pseudo non-dimensional measure of compressor exit mass flow determined by the exit mass flow multiplied by the square root of the compressor exit total temperature ($T_{T3}$) and divided by the compressor exit total temperature ($P_{T3}$). Exit flow function varies in a similar manner to effective and geometric nozzle area as described above at Examples 1 and 2. Thus exit flow function varies as shown in FIG. 7, and continues to change as the stability line is approached at a constant corrected speed and IGV. However, actual values of Exit FF (Exit $FF_{act}$) are determined on the basis of aerodynamic measurements instead of geometry and assumed nozzle characteristics. Consequently, using Exit FF as the selected parameter means that working line threats do not need to be accounted for since the working line is determined continuously by direct measurement. Furthermore, determination of Exit $FF_{act}$ is not reliant on the accuracy of the representation of the actual nozzle hardware by the nozzle characteristics provided to the control system. Consequently, even if the nozzle geometry is inaccurately represented or mal-scheduled, the use of the Exit FF as the selected parameter will continue to provide valid control whereas methods relying on nozzle geometry may be inaccurate.

Exit FF can be calculated using the formula:

$$\frac{W\sqrt{T}}{P} = \sqrt{\frac{\gamma}{R}} \times Cd \times FlowArea \times \sqrt{\left(\frac{2}{\gamma-1}\right)\left(1-\left(\frac{P_{S3}}{P_{T3}}\right)^{\frac{\gamma-1}{\gamma}}\right)}$$

$\gamma$ and R are properties of the working fluid, the flow area is the area between the fan/compressor and the nozzle at which measurements of $P_{T3}$ and $P_{S3}$ are made, and Cd (discharge coefficient) can all be correlated to $P_{T3}/P_{S3}$, so that the exit flow function is a direct function of $P_{T3}/P_{S3}$. Consequently, Exit FF can be determined from direct measurement of $P_{T3}$ and $P_{S3}$ to give the value of Exit $FF_{act}$. To obtain values for Exit $FF_{lim}$ for entry into the look-up table, the value of $P_{T3}$ and $P_{S3}$ at different operating points (ie for different values of IGV or other variables) are correlated directly to stall, surge or flutter during rig testing to establish the position of a clean stall, surge or flutter (or stability) line on the characteristic shown in FIG. 7. Threats to surge (or flutter or stall) can be calculated in terms of exit flow function in accordance with SAE Standard APR 1420. These threats can be expressed as values of $P_{T3}/P_{S3}$ using the equation above using a value for Cd obtained from rig testing. As with the previously-described methods, measurement uncertainty would need to be incorporated as a threat so as to derive the margin-adjusted limiting value.

In all Examples, control of the compressor or fan takes place in response to a comparison between the actual and limiting values of a chosen control parameter (which include any margin established to accommodate threats, as referred to above). If the comparison reveals that the compressor or fan is operating at a point within the safety margin, the control system of the compressor or fan operates to move the operating point away from the stability line, for example by adjusting the selected control parameter. If the comparison reveals that the compressor or fan is approaching the limiting value of the control parameter, the control system of the compressor or fan operates to stop the compressor or fan exceeding the limit by restricting the change of the selected control parameter.

The present invention is applicable to the compressors of gas turbine engines, and to other shaft driven propulsion fans with variable nozzles. It is also applicable to other types of turbo machinery including compressors or fans which are capable or surging, or otherwise exhibiting destructive aeromechanical interaction such as stall or flutter, particularly where the compressor is subject to a significant number of controlling variables (ie more than one such variable) and/or where pinch points on the stability line are difficult to define.

The present invention is particularly useful in compressors or fans used on aircraft. The present invention may be incorporated as part of any land, sea or air vehicle which employs a compressor or fan.

The invention claimed is:

1. A method of controlling the operation of a compressor to avoid stall, surge or flutter, the compressor having an inlet provided with inlet guide vanes, the method comprising predetermining:
   a nominal limiting value of a control parameter of the compressor;
   a variable stall, surge or flutter safety margin as a function of inlet guide vane angle (IGV), non-dimensional speed of the compressor ($N/R\sqrt{T}$), vehicle Mach number (Mn) and inlet geometry (IG); and
   a margin-adjusted limiting value of the control parameter of the compressor as a function of the nominal limiting value and variable stall, surge or flutter safety margin;
   and during operation of the compressor:
   continuously retrieving the margin-adjusted limiting value of the control parameter of the compressor as a function of inlet guide vane angle (IGV), non-dimensional speed of the compressor ($N/R\sqrt{T}$), vehicle Mach number (Mn) and inlet geometry (IG);
   determining in real time an actual value of the control parameter;
   comparing the actual value with the margin-adjusted limiting value; and
   providing an output signal indicating stall, surge or flutter risk if the actual value falls within the stall, surge or flutter safety margin.

2. The method of claim 1, wherein the output signal is input to a controller to modify the condition of the compressor to adjust the actual value of the control parameter to fall outside the stall, surge or flutter safety margin.

3. The method of claim 1, wherein the output signal is input to the controller to modify or stabilise the condition of the compressor such that the actual value of the control parameter is outside the stall, surge or flutter safety margin.

4. The method of claim 1, wherein the output signal is input to the controller to reduce the rate of change of the compressor condition as the actual value of the control parameter approaches the stall, surge or flutter safety margin.

5. The method of claim 1, wherein the control parameter is an effective nozzle area (AE) of the compressor.

6. The method of claim 5, wherein an actual value of the effective nozzle area ($AE_{act}$) of the compressor is determined as a function of nozzle geometric area (AG) and a discharge coefficient (Cd) of the nozzle.

7. The method of claim 6, wherein the discharge coefficient (Cd) is calculated as a function of the nozzle geometric area (AG), vane geometry (ANGVG) and the nozzle pressure ratio (NPR) of the compressor.

8. The method of claim 6, wherein the nozzle geometry is variable by means of actuators, the actual value of the effective nozzle area ($AE_{act}$) being calculated on the basis of signals generated in response to the actuator positions.

9. The method of claim 1, wherein the control parameter is a geometric nozzle area (AG) of the compressor.

10. The method of claim 9, wherein an actual value of the geometric nozzle area ($AG_{lim}$) is retrieved on the basis of an input representing vane geometry (ANGVG).

11. The method of claim 9, wherein an actual value of the geometric nozzle area ($AG_{act}$) is determined as a function of the nozzle geometry of the compressor.

12. The method of claim 11, wherein the nozzle geometry is derived from control data which is used to adjust the nozzle geometry.

13. The method of claim 1, wherein the control parameter is a fan static pressure ratio (PR).

14. The method of claim 13, wherein an actual value of the fan static pressure ratio ($PR_{act}$) is determined from direct measurement of inlet and outlet static pressures ($P_{S2}$, $P_{S3}$) of the compressor.

15. The method of claim 1, wherein the control parameter is a corrected torque (CT) of the compressor.

16. The method of claim 15, wherein an actual value of the corrected torque ($CT_{act}$) is determined as a function of measured or derived torque applied to the compressor and of inlet total pressure ($P_{1A}$).

17. The method of claim 1, wherein the control parameter is compressor exit flow function (Exit FF).

18. The method of claim 17, wherein an actual exit flow function (Exit $FF_{act}$) of the compressor is determined as a function of total to static pressure ratio ($P_{T3}/P_{S3}$).

19. The method of claim 1, in which the stall, surge or flutter safety margin is established on the basis of measurement uncertainty, in determining the actual or limiting values of the parameter.

20. The method of claim 1, wherein the margin-adjusted limiting value is derived from a function of variable stall, surge or flutter safety margin and a nominal limiting value of the control parameter, where the nominal limiting value of the control parameter value is generated by compressor rig testing.

21. A compressor including a control system for controlling the compressor in accordance with the method of claim 1.

22. An aircraft including a compressor in accordance with claim 21.

* * * * *